W. H. Seymour,
Mower.

No. 9476

Sheet. 2. 2 Sheets

Patented. Dec. 14, 1852.

UNITED STATES PATENT OFFICE.

WM. H. SEYMOUR, OF BROCKPORT, NEW YORK, ASSIGNOR TO SEYMOUR & MORGAN.

IMPROVEMENT IN GRAIN AND GRASS HARVESTERS.

Specification forming part of Letters Patent No. 9,476, dated December 14, 1852; antedated October 25, 1852.

*To all whom it may concern:*

Be it known that I, WILLIAM H. SEYMOUR, of Brockport, in the county of Monroe and State of New York, have invented certain new and useful Improvements in Harvesting-Machines, of which the following is a full, clear, and exact description, reference being had to the accompanying drawings, in which—

Figure 1:
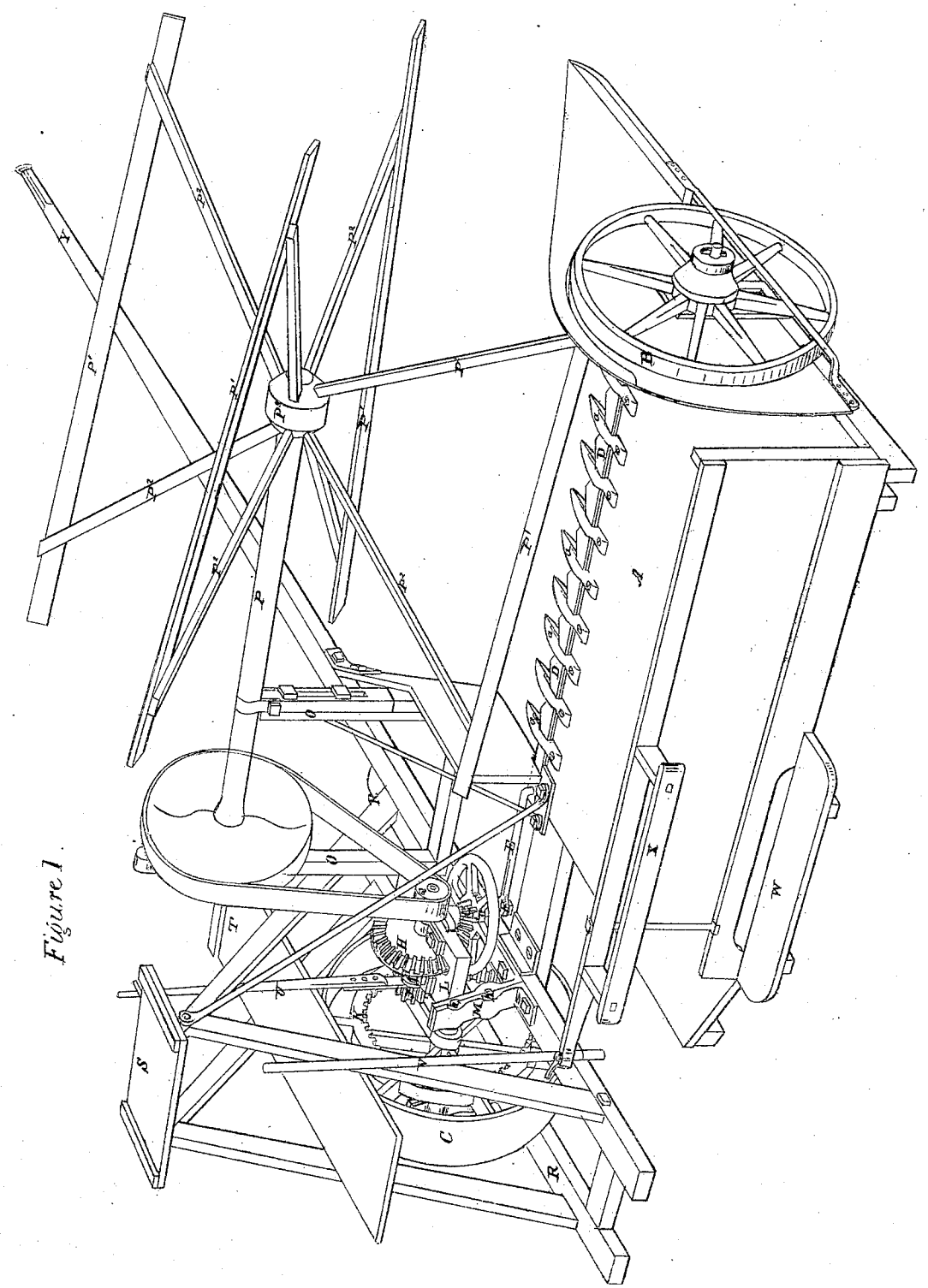
Figure 2:
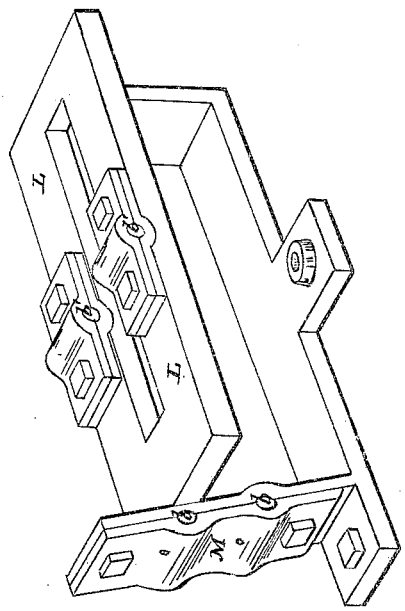

Figure 1 represents a view in perspective of a machine having my improvements applied thereto. Fig. 2 represents a view in perspective of a supplementary frame for the support of the gearing detached from the main frame.

The first part of my invention consists in arranging at the back of the platform a stand for the person who throws off the grain, and supporting it by a brace from the frame of the driver's seat. By this arrangement the raker's stand is supported with sufficient firmness to dispense with a third wheel under the rear edge of the platform, which interferes with the free rising and falling of the front portion of the frame in adapting the cutter to the undulations of the surface of the ground.

The frame of a reaping-machine must of necessity be made light in order that the machine may be sufficiently portable, and as it is broad, long, and low, it cannot be made so rigid that it will not twist and work while running over uneven ground. This twisting of the frame has been the cause of considerable difficulty in consequence of the frequency with which it deranges the action of the running-gear, sometimes by forcing the parts too near together, sometimes by separating them, and at other times by causing the journals of the shafts to bind in their bearings and heat or bend, thus causing them to run with great irregularity and friction.

It is the object of the second part of my invention to remedy this defect by constructing and arranging a metallic frame to support the bearings of the main driving-wheel, the gear that transmits motion from the driving-wheel to the train of multiplying-wheels, the latter, the crank that works the sickle, and the clutch which throws the driving-wheel into and out of gear with the counter-shaft, this supplementary frame being made strong and rigid, so that it cannot easily be bent out of shape, in order that when connected to the main frame of the machine the latter may be light and free to twist and work, while its movements will not twist the bearings of the gearing or otherwise interfere with the proper action thereof, thus adding to the durability of the machine and greatly lessening its liability to derangement and stoppage while at work.

The machine represented in the accompanying drawings has a platform, A, supported by two wheels of light construction, one, B, to support the inner end of the machine, or that next the standing grain, and the other, C, at the outer end, being to produce sufficient adhesion to the ground to drive the gearing which gives motion to the cutter and reel. The front edge of this platform is fitted with a reciprocating sickle, D, of the usual construction, and fingers $a$ to enter between the stalks of standing grain and support them while being cut by the sickle. This sickle is connected by a link-rod, E, with a crank, F, which gives it motion. The crank F is turned by a pinion, G, driven by a bevel-wheel, H, on the inner end of a counter-shaft, I, whose outer end is fitted with a pinion, J, which gears into an internal spur-wheel, K, on the side of the main driving-wheel C. The shafts of this train of gearing are supported in suitable bearings in the frame L, which, being in this instance cast in one piece and made strong, keeps all the different parts of the gearing in their proper relative positions. As it is not essential that the outside journal of the driving-wheel should be supported in the supplementary frame when an internal gear-wheel, K, is used, the supplementary frame, for lightness, is not in this case made to surround the driving-wheel, but the latter is supported in a bearing formed in a standard, M, which has one or more supplementary bearings, $b$, at different elevations, corresponding to a like series of bearings, $b'$, in the frame L. The series of bearings $b$ are for the purpose of setting the platform A at a greater or less elevation to carry the cutter, so as to cut grain higher or lower, as may be desired. The opposite end of the platform is fitted with bearings for the wheel B, so constructed that this end of the machine can be raised and lowered to correspond with its outer end.

The reel for pressing the grain against the sickle and turning it over upon the platform when cut is supported by two posts, O, erected near the front of the outer end of the frame. These posts have bearings formed in them in such manner that they will support the shaft P at different heights to adapt the reel to the cutting of grain of different lengths. The outer end of the shaft projects beyond the reel, so that the bearings by which it is supported are outside of the circle in which the vanes P' turn. These vanes are supported by spokes $P^2$, extending from a central hub, $P^3$, at the inner extremity of the shaft; but the spokes may be passed through the shaft in the usual manner, if preferred, the sole difference which it is necessary to make between this and other reels heretofore invented being to extend its shaft beyond the outer ends of the vanes far enough to give room for two bearings at a sufficient distance apart to keep it steady without the necessity of employing a post to support its inner end. The reel is rotated by means of a belt which encircles it and a pulley, Q, on the inner end of the counter-shaft I.

A triangular frame, R, is erected upon the outer end of the main frame to support the seat S and foot-board T of the driver or director of the machine. The foot-board has a lever, U, pivoted to it, by means of which a clutch on the counter-shaft is shifted to throw the same into and out of gear with the driving-wheel K. This frame also sustains a brace, V, by means of which a stand, W, surrounded by railing X, is supported on the back of the platform A. The stand W and railing X are to support the person who discharges the cut grain from the platform as fast as it accumulates in quantities sufficient to form a sheaf. This stand allows the operator to perform his work in an easy and natural position, in which he is free to sweep his fork from the inner to the outer end of the platform to remove the cut grain, and by having two forks of different shapes, which he can exchange from time to time, he can work alternately right and left hand first, as the ample size and convenient arrangement of the stand admits of his placing himself in any suitable position, which is of great practical importance, as the seat for the raker usually employed on harvesting-machines only admits of a person sitting in a single confined position, and restrains the freedom of his movements to an extent which imposes too much duty upon particular muscles, and therefore exhausts his strength much sooner than if he were free to change his position from time to time while performing his duty of keeping the platform clear, which, at best, is so severe that one raker can only work for a short time before he must be relieved by another. The stay or brace V holds up the back of the platform so firmly that the third wheel is unnecessary, and as the brace is placed at a sufficient height to permit the grain to be discharged from the platform beneath it, it does not in any way interfere with the raking.

The machine is drawn by a team harnessed to a tongue, Y, which projects from the frame in front of the driving-wheel.

Having thus described my improved harvesting-machine, what I claim as my invention, and desire to secure by Letters Patent, is—

1. The method herein described of supporting the stand for the raker at the back of the platform by means of a brace extending to the outer end of the frame, and so arranged as not to impede the action of the raker or the discharge of the cut grain, the several parts being constructed and arranged as described.

2. The method herein described of protecting the gearing of the machine from injury by the working and twisting of the main frame by mounting the said gearing in a supplementary metallic frame constructed as described, and rigidly connected to one end of the main frame upon which it is mounted, as herein set forth.

In testimony whereof I have hereunto subscribed my name.

WILLIAM H. SEYMOUR.

Witnesses:
JAMES ROBY,
GEORGE H. ALLEN.